United States Patent [19]

Baughman et al.

[11] 4,389,217

[45] Jun. 21, 1983

[54] INTEGRATED TIME-TEMPERATURE OR RADIATION-DOSAGE HISTORY RECORDING DEVICE

[75] Inventors: Ray H. Baughman; Gordhanbhai N. Patel, both of Morris Plains; Granville G. Miller, Morristown, all of N.J.

[73] Assignee: Allied Corporation, Morris Township, Morris County, N.J.

[21] Appl. No.: 209,931

[22] Filed: Nov. 24, 1980

Related U.S. Application Data

[63] Continuation of Ser. No. 38,041, May 11, 1979, abandoned, which is a continuation-in-part of Ser. No. 839,542, Oct. 5, 1977, abandoned.

[51] Int. Cl.$^3$ ............... G01K 11/12; G01N 31/00; G01T 1/02; G01T 1/08
[52] U.S. Cl. ............................. 436/2; 436/58; 436/147; 436/169; 436/905; 374/106; 116/200; 116/216; 250/474.1; 422/56; 422/58; 426/88; 430/270
[58] Field of Search ............... 422/56, 57, 58, 119; 23/230 R, 230.3; 250/474; 252/408; 426/88; 73/356; 116/200, 216

[56] References Cited

U.S. PATENT DOCUMENTS

| | | | |
|---|---|---|---|
| T910,005 | 5/1973 | Rasch et al. | 430/270 X |
| 3,501,302 | 3/1970 | Poltz | 430/332 X |
| 3,679,738 | 7/1972 | Creameans | 430/270 X |
| 3,723,121 | 3/1973 | Houser | 430/20 |
| 3,743,505 | 7/1973 | Bloom et al. | 430/20 |
| 3,822,134 | 7/1974 | Rasch et al. | 430/539 |
| 3,999,946 | 12/1976 | Patel et al. | 422/56 |
| 4,070,912 | 1/1978 | McNaughton | 116/216 X |
| 4,189,399 | 2/1980 | Patel | 250/474 X |
| 4,195,055 | 3/1980 | Patel | 422/56 |
| 4,195,056 | 3/1980 | Patel | 422/56 |
| 4,195,058 | 3/1980 | Patel | 422/56 |
| 4,208,186 | 6/1980 | Patel | 422/56 X |
| 4,228,126 | 10/1980 | Patel | 422/56 |
| 4,235,108 | 11/1980 | Patel | 250/474 X |
| 4,238,352 | 12/1980 | Patel | 250/474 X |
| 4,276,190 | 6/1981 | Patel | 73/356 X |

*Primary Examiner*—Barry Richman
*Attorney, Agent, or Firm*—Kenneth E. Stroup, Jr.; Alan M. Doernberg; Gerhard H. Fuchs

[57] ABSTRACT

A recording device is described, useful as an integrated time-temperature or radiation-dosage history indicator. The device contains a substrate having deposited thereon at least two indicating units, one being unreacted and representing zero time of exposure and the other unit being pre-reacted. Each unit is comprised of an acetylenic compound containing at least one —C≡C—C≡C— group, capable of reacting by 1,4-addition polymerization thereby forming an end-point color after an irreversible, progressive color change upon thermal annealing or exposure to actinic radiation. The end-point color represents an integrated time-temperature history of thermal annealing or radiation-dosage history. Each unit is constructed such that the time required to form the end-point color by thermal annealing at a given temperature or for a known thermal history, or exposure to actinic radiation at a given average radiation dosage rate, is predetermined. A process is also described for using the device as well as an article having the device affixed thereto.

15 Claims, 5 Drawing Figures

INTEGRATED TIME-TEMPERATURE OR RADIATION-DOSAGE HISTORY RECORDING DEVICE

DESCRIPTION

This is a continuation of application Ser. No. 38,041 filed May 11, 1979 now abandoned which is a CIP of abandoned application Ser. No. 839,542 filed Oct. 5, 1977.

BACKGROUND OF THE INVENTION

1. Field of the Invention

This invention relates to a recording device for monitoring the integrated time-temperature or radiation-dosage history of an article.

2. Background of the Invention

Time-temperature history indicators for measuring the integrated thermal exposure of articles such as perishable foods, pharmaceuticals, photographic film, blood and the like are well known in the art.

A recording device comprised of a series of temperature-sensitive, color-responsive liquid crystals is disclosed in U.S. Pat. No. 3,661,142 (Flam, 1972) wherein a series of varying liquid crystal compositions undergoes color changes at different temperatures. However, this device does not permanently record time-temperature history since the liquid crystals are thermochromic and undergo reversible color changes.

Other recording devices based upon color changes associated with varying composition are disclosed in U.S. Pat. No. 3,871,232 (Pickett et al., 1973) in which solids having different melting points solubilize a dye upon melting, thus indicating the maximum temperature exceeded; and U.S. Pat. No. 3,700,603 (Rembaum, 1972) which employs complexes of electron-donating and electron-accepting organic compounds to form colored complexes in the liquid state to indicate that a particular temperature has been exceeded. However, both these devices record the maximum temperature achieved rather than the integrated time-temperature history.

A time-temperature integrating indicator is disclosed in U.S. Pat. No. 3,768,976 (Hu et al., 1973) in which a redox dye is colored in its reduced state but turns clear in the oxidized state due to the diffusion of oxygen into the device over a predetermined time interval. The disappearance of the color reveals a message such as "Don't eat this food." The indicator can be set for various predetermined times at various temperatures and functions therefor as an integral time-temperature history indicator. However, the device suffers from the disadvantage of depending on diffusion rates of oxygen to deactivate the indicator wherein the diffusion rates are subject to many variations. Most important, this device indicates whether or not a particular integral time-temperature exposure has been exceeded, but does not clearly indicate the precise value of this exposure.

A time-temperature indicating device is disclosed in U.S. Pat. No. 3,344,670 (Olson et al., 1967) comprising paper impregnated with deposited silver nitrate, which upon exposure to temperature, changes color wherein the time-temperature history can be determined by reference to a calibrated color chart. However, this indicator suffers from the disadvantage that the color transitions are gradual rather than sharp and the active ingredient is expensive.

Polyacetylenes having at least two conjugated $C \equiv C$ groups have been disclosed in U.S. Pat. No. 3,822,134 (Rasch et al., 1974) for use as vacuum deposited radiation sensitive elements which undergo a color change upon exposure to high temperatures or radiation.

Indicators have been disclosed in U.S. Pat. No. 3,999,946 (Patel et al., 1976), which describes utilizing acetylenic compounds containing at least two conjugated $C \equiv C$ groups for measuring time-temperature histories of a large number of perishable products. Also disclosed is the use of gamma radiation at liquid nitrogen temperature, $-196°$ C., in order to dramatically alter the reactivity rate of several diacetylenes.

The reference, Di Macromolekulare Chemie 145 (1971) pp. 85–94, describes the thermal polymerization characteristics of bis(p-toluenesulfonate) of 2,4-hexadiyn-1,6-diol. However, the reference does not discuss the utility of prereacting this particular diacetylene to a known extent to form an end-point color in a predetermined time when thermally annealed.

The reference, U.S. Pat. No. 3,501,302 (1970) describes irradiating photosensitive crystalline polyacetylene compounds with ultraviolet radiation and measuring the time required for a given ultraviolet radiation dosage to develop the compound to a known color standard. However, no mention is made of the possibility of using this technique for prereacting the diacetylene compounds for forming an indicator tab in which the time required to produce the final end-point color has been decreased to a known extent.

However, a wide variety of perishables exist which require different indicators because each possesses a different time-temperature history related shelf life which is critical and must be accurately monitored in order to insure quality.

What is needed and what the prior art does not provide are devices suitable for measuring the integrated time-temperature or radiation-dosage histories of a wide variety of products by recording indicators, which can be manufactured from a relatively small number of inexpensive materials.

SUMMARY OF THE INVENTION

According to this invention, there is provided a device, useful as an integrated time-temperature or radiation-dosage history indicator, comprising a substrate having deposited thereon at least two indicating units, each unit comprised of an acetylenic compound or simple mixture thereof, each acetylenic compound containing at least one —$C \equiv C\text{-}C \equiv C$— group, capable of reacting by 1,4-addition polymerization, thereby forming an end-point color after an irreversible, progressive color change upon thermal annealing or exposure to actinic radiation, said end-point color representing an integrated time-temperature history of thermal annealing or radiation-dosage history of exposure to actinic radiation wherein one indicating unit is unreacted and representing zero time of exposure and the other said indicating unit being pre-reacted by thermal annealing or exposure to actinic radiation to a known extent whereby the time required by each unit to form the end-point color by thermal annealing at a given temperature or for a known thermal history, or exposure to actinic radiation at a given average radiation dosage rate, is predetermined.

Also provided is a process for measuring the integrated time-temperature or radiation-dosage history of an article comprising the steps of (a) applying to an article the device of this invention and (b) observing the developing color changes in the device.

Further provided is an article with the device of this invention attached thereto.

BRIEF DESCRIPTION OF THE DRAWINGS

FIG. 3 illustrates a side view of the assembly showing the array of exposed strips 2 pressed onto the adhesive substrate 1. The reassembled array is then cut vertically into six strips along the solid lines indicated by the arrows in FIG. 2 to form six identical recording strips containing a progressive series of prereacted indicating units. The recording strips are now ready for use and can be used to measure the integrated time-temperature history of an article at temperature T for times $t_0$ and $t_5$, or for monitoring thermal exposure under more general conditions of fluctuating temperature. The individual recording strips are exposed to temperature T for different times t as indicated in FIG. 2.

DETAILED DESCRIPTION OF THE INVENTION AND THE PREFERRED EMBODIMENTS

Figure 1:
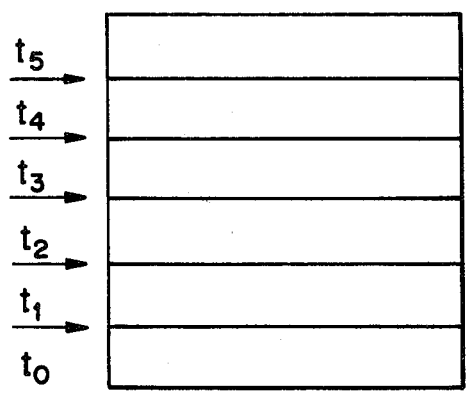
FIGS. 1, 2 and 3 illustrate the construction and use of six individual recording devices containing a series of pre-reacted indicating units. A suitable absorbent substrate, uniformly coated with a thermally reacted acetylenic compound such as 2,4-hexadiyn-1,6-diol bis(p-toluenesulfonate), also designated BTS, as depicted in FIG. 1, is cut horizontally into six strips along the solid lines indicated by the arrows, and each strip exposed to temperature T for different times t as indicated. Thus, the bottom strip is exposed for time $t_0$, representing zero time of exposure, being non-exposed, the next strip exposed for finite $t_1$ and the remaining strips successively exposed for the indicated times. The exposed strips are reassembled into their original positions and fitted onto a suitable adhesive substrate 1 as depicted in FIG. 2.

The device of this invention comprises a substrate being deposited thereon at least two indicating units comprised of an acetylenic compound, or simple mixture thereof, one of which has been pre-reacted by thermal annealing or exposure to actinic radiation, and the other being unreacted and representing zero time of exposure. The acetylenic compound is colorless, contains at least one —C≡C—C≡C— group, and upon thermal annealing or exposure to actinic radiation, undergoes an intermolecular 1,4-addition polymerization which causes a progressive color change to occur resulting in an end-point color which is generally a different hue than the color produced initially by the 1,4-addition polymerization. The progressive color change usually proceeds to a pink then to a dark red and finally to a dark blue or a metallic green-gold color which represent end-point colors. These end-point colors of the fully reacted acetylenic compound, are readily contrasted to the gradual progressive color change and allows the convenient determination of when the integrated time-temperature or radiation-dosage history is complete. The end-point color usually corresponds to a high degree of polymerization (about 60 to 100 percent) of the acetylenic compound by 1,4-addition, such that when that degree of polymerization is reached, further exposure at that temperature or radiation dosage will only result in extreme cases in a deepening of the end-point color and will still be readily distinguishable from the gradual color development of the intermediate steps. In addition to utilizing fully reacted acetylenic compound or the end-point color, a relatively lightfast dye or pigment whose hue is equal to that of said fully actylenic compound may also be optionally employed as an end-point reference tab. In general, a sharp color change to the endpoint color will desirably occur just prior to the expiration of the desired time-temperature history to be measured.

Advantage can also be taken of the fact that contrasting changes in color also occur before the end-point color is reached. Thus, an intermediate color can be used as a reference-point color to determine the integrated time-temperature or radiation-dosage history. In such cases, the device can include one or more intermediate color reference tabs indicating the color which corresponds to a known integrated time-temperature or radiation-dosage history. Thus, a further embodiment of this invention is the device of this invention wherein a contrasting change in color produced during 1,4-addition polymerization, before the end-point color is reached, wherein the color represents an integrated time-temperature history of thermal annealing or radiation-dosage history of exposure to actinic radiation.

By the term "indicating unit", as used herein, is meant an area of deposited acetylinic compound, being pre-reacted or unreacted, representing a certain time of exposure. A unit can thus be an individual tab, or a particular gradient section or a defined area on a continuous substrate.

By the term "pre-reacted", as used herein, is meant that the acetylenic compound is subjected to thermal annealing or exposure to actinic radiation, for a known extent, to advance the time for development of color under the particular monitoring conditions.

By the term "zero time of exposure" and "unreacted", as used herein, is meant acetylenic compound not subjected to the pre-reaction process and representing the device color at the initiation of the monitoring process.

By the terms "integrated time-temperature history" or "integrated radiation-dosage history" is meant the integrated value of the thermal history over the total exposure time, or the integrated value of the radiation-dosage rate over the total exposure time. Thus, a feature of the subject device is that development of the end-point color is not dependent upon a single temperature or radiation dosage rate.

For example, exposure of a perishable to a high temperature for a short time period can produce the same amount of degradation as exposure at a lower temperature for a much longer time period. An indicator matched to this perishable would then provide the same response whether the exposure was at the high temperature for a short time period or at the lower temperature for a longer time period.

Acetylenic compounds, containing at least one —C≡C—C≡C— group and capable of undergoing an irreversible color change upon thermal annealing or exposure to actinic radiation, have been broadly disclosed as being useful in the application of measuring the time-temperature histories of articles as disclosed in U.S. Pat. No. 3,999,946 (Patel et al., 1976). However, the broad class of acetylenic compounds disclosed possesses widely variable rates of color development. For example, BTS [(2,4-hexadiyn-1,6-diol bis(p-toluenesulfonate)] requires about one month annealing at room temperature to form an end-point color, whereas a low reactivity phase of HDDPU [2,4-hexadiynl,6-diol bis(phenylurethane)] is expected to require about ten years annealing at room temperature to form an endpoint color. This wide range of variability in the reactivity of these acetylenic compounds is generally a normal feature of their behavior, but necessitates a careful search for an acetylenic compound whose time-temperature characteristics match the degradation characteristics of a particular perishable, i.e., the shelf-life at a reference temperature.

It has been found that by pre-reacting the acetylenic compound, or simple mixture thereof, by thermal annealing or exposure to actinic radiation, below the respective melting point, the time required for formation of the end-point color can be significantly decreased and regulated to known predetermined values. Thus, by prereacting the acetylenic compound, and including one unit which is unreacted, devices can be tailor-made for selectively measuring time-temperature history in the ranges required for various perishables (such as monitoring the storage of blood for 21 days at 4° C.) or guaranteeing the adequacy of various thermal processing steps (such as the sterilization of blood albumin for 10 hours at 60° C.).

Acetylenic compounds which are applicable in the invention are those containing at least one —C≡C—C≡C— group and capable of reacting by 1,4-addition polymerization thereby forming an end-point color after an irreversible, progressive color change upon thermal annealing or exposure to actinic radiation. Acetylenic compounds of these characteristics are suitably described in U.S. Pat. No. 3,999,946 (Patel et al., 1976), and include hexaynes, tetraynes, triynes and diynes. Included are diynes of the formula R—C≡C—C≡C—R' wherein the substituent groups R and R' are selected from the group consisting of alkyl, aryl, sulfonate, urethane, acid, ester and alcohol radicals which are also broadly disclosed in U.S. Pat. No. 3,999,946, supra.

A particularly valuable class of acetylenic compounds useful in the invention are diynes selected from the group consisting of 2,4-hexadiyn-1,6-diol, 3,5-octadiyn-1,8-diol, 4,6-decadiyn-1,10-diol, 5,7-dodecadiyn-1,12-diol and sulfonate and urethane derivatives thereof.

Preferred diynes are HDDBU, 2,4-hexadiyn-1,6-diol bis(n-butylurethane), and BTS, 2,4-hexadiyn-1,6-diol bis(p-toluenesulfonate).

Representative examples of acetylenic compounds which are applicable in the invention include diynes, triynes, tetraynes and hexaynes as listed below. Included are diynes of the formula R—C≡C—C≡C—R' wherein R and R' can be the same or different, and where R can contain a methylene chain, $(CH_2)_n$, wherein n of the methylene chain is an integer value including 1 to 4. The examples include diynes of the following classes, where R and R' are the same resulting in a symmetrical compound, unless otherwise indicated:

CL (A) Diyn-diols R=$(CH_2)_n$-OH e.g.   HO—CH$_2$—CH$_2$—C≡C—C≡C—CH$_2$—CH$_2$—OH, 3,5-octadiyn-1,8-diol (B) Diyn-diurethanes R=$(CH_2)_n$—O—CO—NH—X, where X is alkyl or aryl e.g.

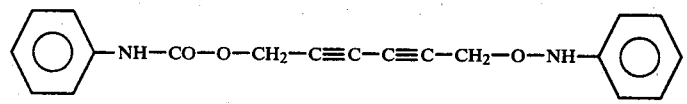

2,4-hexadiyn-1,6-diol bis(phenylurethane)

(C) Diyn-diesters

R=—$(CH_2)_n$—O—CO—Y, where Y is alkyl or aryl e.g.

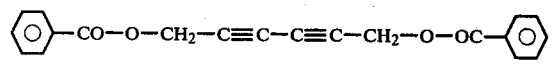

2,4-hexadiyn-1,6-diol bis(benzoate)

Diyn-Sulfonate (D)

R=$(CH_2)_n$—O—SO$_2$—Z, where Z is alkyl or aryl e.g.

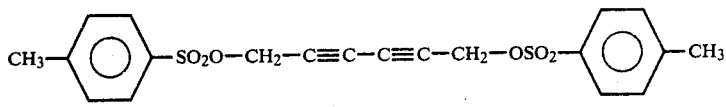

2,4-hexadiyn-1,6-diol bis(p-toluenesulfonate)

(E) Diyn-diurethane-esters

R=(CH$_2$)$_n$O—CO—NH—CH$_2$—CO—O—A, wherein A is alkyl e.g. [C$_2$H$_5$O—CO—CH$_2$—NH—CO—O—(CH$_2$)$_3$—C≡C—C≡C]$_2$ 4,6-decadiyn-1,10-diol bis(ethylcarboxymethylurethane)

(F) Miscellaneous classes including asymmetrically substituted compounds where R and R' are different e.g. HOOC—(CH$_2$)$_8$—C≡C—C≡C—CH$_2$—OH, 10,12-tetradecadiynoic acid-14-ol Triynes R—C≡C—C≡C—(CH$_2$)$_2$—C≡CH e.g. CH$_3$—NH—O—CO—CH$_2$—C≡C—C≡C—(CH$_2$)$_2$—C≡CH 2,4,8-nonatriyn-1-N-methylurethane Tetraynes R—C≡C—C≡C—(CH$_2$)$_2$—C≡C—C≡C-R or R'—C≡C—C≡C—C≡C—R' e.g. CH$_3$—NH—O—CO—CH$_2$—C≡C—C≡C—CH$_2$—CH$_2$—C≡C—C≡C—CH$_2$—O—CO—NH—CH$_3$ 2,4,8,10-dodecatetrayn-1,12-diol bis(methylurethane) e.g. [C$_2$H$_5$—NH—CO—O—CH$_2$—C≡C—C≡]$_2$ 2,4,6,8-decatetrayn-1,10-diol bis(ethylurethane)

Hexaynes

R—C≡C—C≡C—(CH$_2$)$_2$—C≡C—C≡C—(CH$_2$)$_2$—C≡C—C≡C—R' e.g. [CH$_3$NHCO—O—CH$_2$—C≡C—C≡C—(CH$_2$)$_2$—C≡C]$_2$ 2,4,8,10,14,16-octadecahecayn-1,18-diol bis)methylurethane)

Crosslinkable Acetylenic Polymers

[O—CO—NH—X—NH—CO—O—(CH$_2$)$_m$—C≡C—C≡C—(CH$_2$)$_m$]$_n$, where X is alkyl or aryl e.g. [O—CO—NH—(CH$_2$)$_6$—NH—CO—O—(CH$_2$)$_4$—C≡C—C≡C—(CH$_2$)$_4$]$_n$ poly(5,7-dodecadiyn-1,12-diol bis(hexamethyleneurethane)]

The acetylenic compounds of the indicating units may be pre-reacted by thermal annealing or by exposure to actinic radiation below the respective melting point of the acetylenic compound. By the term thermal annealing is meant heating the device or the acetylenic compound at a temperature ranging from −50° to about 400° C. for a predetermined amount of time ranging from a fraction of a second to several years. And by the term actinic radiation is meant visible, ultraviolet radiation, gamma radiation, x-rays, alpha rays, beta rays, electron beam radiation, laser beam radiation and the like. Since reactivity typically sharply increases with increasing temperature, annealing times of several hours or less than be conveniently employed by selecting higher annealing temperatures. The choice in the method of pretreating, whether being thermal annealing or exposure to active radiation is usually not critical with respect to the device application. Thus, for example, one can pretreat by exposing to actinic radiation to construct a device for measuring integrated time-temperature history, and conversely, one can pretreat by thermal annealing to construct a device for measuring integrated radiation exposure.

The amounts of thermal annealing and/or exposure to actinic radiation for pre-reaction will of course depend upon the type of device that is desired. For example, if a device were desired which measured the time of exposure to a temperature of 4° C. over a required time period of 21 days, which is the shelf-life of stored human blood, and it is desired to know when 50% of the time and elapsed, e.g. 10.5 days, then one would choose an acetylenic compound that can be pretreated by thermal annealing or exposure to actinic radiation so as to undergo an irreversible color change to an end-point color in 21 days at 4° C., e.g. from a pink to a metallic gold. One would then prepare two indicating units wherein one unit would consist of unreacted acetylenic compound, and the other unit would consist of the same acetylenic compound but prereacted by annealing or radiation such that formation of the end-point color would be equivalent to 10.5 days exposure at 4° C. Thus, after 10.5 days at 4° C. have elapsed, the second indicator tab would be metallic gold indicating that 50 percent of the shelf life has expired. This type of recording device would be especially useful in the monitoring of the storage of blood, wherein state law requires a maximum shelf life of 21 days at 4° C. and must be strictly adhered to. Storage of the blood at higher temperatures will result in more rapid development of indication response and indicate that the same integrated time-temperature history has elapsed. Preferred methods of pre-reacting are by thermal annealing, or exposure to a laser beam or electron beam, gamma radiation, or ultraviolet radiation.

The consequence of pre-reacting a unit by exposing to actinic radiation prior to thermal annealing is to shift the response of a particular unit closer to the end-point color by causing a specific amount of reaction. This application does not result from increasing the rate of polymerization by 1,4-addition, at a particular degree of reaction by the trapping of active species generated, for example, by actinic radiation. At the temperature preferably employed for pretreatment in the present invention (20° C.–300° C.) such active species are not trapped to a significant extent.

The device of the invention comprises at least two indicating units, one of which is unreacted and representing zero time of exposure and the other being pre-reacted to a known extent by thermal annealing or exposure to actinic radiation. Each unit is comprised of an acetylenic compound, or simple mixture thereof, each acetylenic compound containing at least one —C≡C—C≡C— group, capable of reacting by 1,4-addition polymerization thereby forming an end-point color after an irreversible, progressive color change upon exposure to actinic radiation, said end-point color representing an integrated time-temperature history of thermal annealing or exposure to actinic radiation to a known extent, whereby the time required for each unit to form the end-point color by thermal annealing at a given temperature or known thermal history or exposure to actinic radiation at a given radiation dosage is predetermined.

The device in its simplest form can be an unreacted unit in combination with a unit displaying end-point color, or an unreacted unit in combination with a unit pre-reacted to an extent prior to exhibiting end-point color. For example, two indicating units, comprised of a substrate coated with BTS, one unreacted and the other pretreated to a known extent, is applicable in many different applications. For example, such a device, in which the pre-treated unit is pretreated by thermal annealing at 80° C. for 200 minutes, results in a device which can be used to monitor the shelf-life of blood at 4° C. for 21 days. Just prior to the end of the shelf life period, the pre-reacted unit will form the end-point color indicating the shelf-life has expired. Alternatively, the pre-reacted unit of BTS can be pre-treated by exposing to short wave length ultraviolet radiation, from an 100 Watt high pressure mercury lamp for about 15 to 30 seconds, so as to produce an indicator for monitoring the time-temperature history during the process of sterilizing blood albumin (60° C. for ten hours). Each unit may contain one acetylenic compound or a simple mixture of acetylenic compounds as disclosed herein. It is preferred to use one acetylenic compound in each indicating unit.

Preferred embodiments of the single device are where one unit is unreacted and the other unit is prereacted and forms the end-point color in about 15 to 30 days at a temperature of about 0° to 10° C.; wherein the end-point color is formed in about 8 to 12 hours at a temperature of 50° to 70° C.

A further embodiment of the two unit device is where the pre-reacted acetylenic compound is 2,4-hexadiyn-1,6-diol bis(p-toluenesulfonate) and forms the end-point color in about 1 month to 2 years at 0° to 8° C. Such prereacted indicating unit can be prepared for example by pretreating the 2,4-hexadiyn-1,6-diol bis(p-toluenesulfonate) via thermal annealing at about 37° C. for about 12 days. The pre-treated indicating unit will then form the end-point color by exposure at about 5° C. in about 0.7 years or at about 0° C. in about 1.5 years. Thus, by proper selection of pre-treatment time and temperature, the indicating unit, containing pre-reacted 2,4-hexadiyn-1,6-diol bis(p-toluenesulfonate) can be used to monitor the shelf life of perishable products at 0°–8° C. for time periods ranging from about 1 month to about 2 years or for shorter periods at higher temperatures or longer periods at lower temperatures. This device has direct application in monitoring the shelf lives of various vaccines and serums described in Title 21, Section 610.53 of the Code of Federal Regulations where shelf lives after the dating periods range from about 1 month to 2 years at 0° to 8° C. for many of the listed products.

Figure 2:
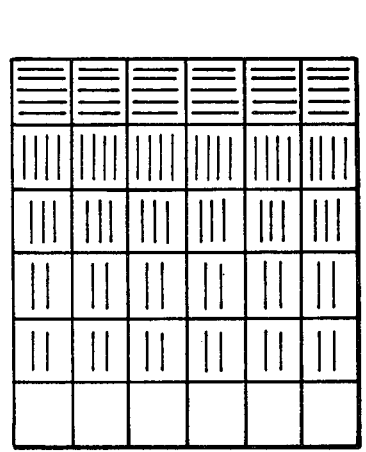
Figure 3:
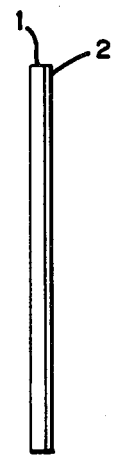

A more complex embodiment of the invention is where the device, in addition to the unreacted indicating unit, further comprises a series of pre-reacted indicating units, as in FIG. 2, whereby each prereacted unit containing an acetylenic compound or simple mixture thereof, is pre-reacted to a greater known extent than its predecessor thereby decreasing by known intervals the time required for each unit to form the end-point color compared to the preceding unit, whereby the number of indicating units which have formed the end-point color upon exposing the device to thermal annealing or actinic radiation corresponds to the history of the exposure integrated over the exposure time to which the device has been subjected. It is preferred to pre-react each pre-reacted unit to at least about a 5% greater extent than its predecessor. For example, if the device is constructed such that at 80° C., an indicating unit will form the end-point color every 15 minutes, the number of such units forming the end-point color at the end of the exposure time will correspond to the time-temperature history of the exposure. The series device can be further comprised of one unit which exhibits end-point color. Said end-point color can either be fully reacted acetylenic compound or a suitable dye or pigment exhibiting the same color.

The series device contains a plurality of indicating units, in which generally the same acetylenic compound, or simple mixture thereof, is used for every indicating unit. However, some indicating units may contain a different acetylenic compound, or simple mixture thereof, if desired.

Figure 5:
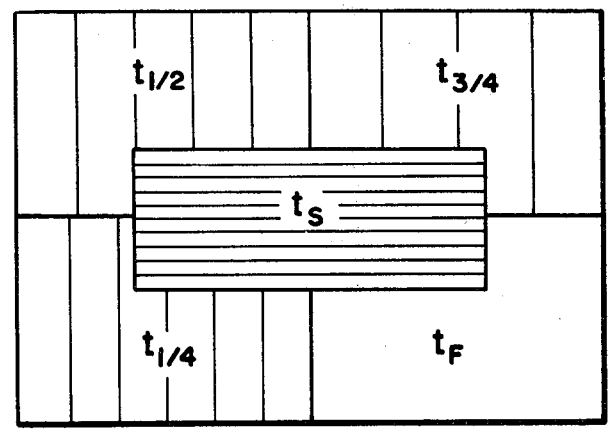
FIG. 5 illustrates a different embodiment of the recording device for conveniently measuring portions of the shelf-life of an article. The element, $t_s$, represents the standard color when the total shelf-life i.e., storage time, $t_s$, at a reference temperature, $T_R$, or progressively shorter storage times at higher temperatures, has elapsed. The elements $t_{\frac{1}{4}}$, $t_{\frac{1}{2}}$, $t_{\frac{3}{4}}$, and $t_F$ (representing time zero) represent elements whose color changes will match $t_s$ when $\frac{1}{4}$, $\frac{1}{2}$, $\frac{3}{4}$ and total shelf-life periods have elapsed. These elements are obtained by progressively shorter thermal or radiation pretreatment of the indicator tabs.

The design of the series device can be any conventional type of design suitable for the desired application, and includes a linear series such as illustrated in FIG. 2 and also a non-linear series such as illustrated in FIG. 5.

The series device can also further comprise at least one indicating unit which is fully pre-reacted resulting in an internal reference standard as depicted in FIG. 2. A specific embodiment of the series device contains five indicating units, each unit containing 2,4-hexadiyn-1,6-diol bis(p-toluenesulfonate), where one unit is unreacted and four units are pre-reacted by thermal annealing and progressively form the end-point color in about 1, 2, 3 or 4 days, respectively, at about 37° C. Such device has utility in measuring the fractionally expired shelf life of previously discussed vaccines and serums. Alternately, the device can be utilized for measuring the fractionally expired shelf life of vaccines and serums at lower temperatures for longer periods of time. For example, the indicating unit which forms the end-point color at about 37° C. in 4 days will also form the end-point color in about 1.5 years at 0° C.

The subject device is prepared by depositing acetylenic compound onto a substrate, or tab, and prereacting one tab or section of the substrate by thermal annealing or exposure to actinic radiation, while allowing one tab or section to be unreacted. Thus, one tab or section of said substrate contains unreacted acetylenic compound representing zero time of exposure.

Since the acetylenic compounds are usually sensitive to visible and ultraviolet light, and since the devices might be utilized as time-temperature history indicators of an article which is likely to be subjected to ultraviolet or visible light (which would adversely interfere in device response), suitable ultraviolet absorbers such as a Tinuvin-P ®, Tinuvin-328 ® or benzotriazole can be incorporated into the indicator component to eliminate improper functioning of time-temperature indicators as a consequence of photoreaction.

The substrate of the device can be any substrate which does not chemically interfere with device operation and provides sufficient rigid support for the acetylenic compound deposited thereon. Included among representative examples of substrates are filter paper, aluminum foil, plastics, glasses and metals.

The indicator composition can be deposited onto the substrate by conventional methods as disclosed in U.S. Pat. No. 3,999,946, such as deposition from solvent, followed by solvent evaporation, or melt phase deposition. Alternately, the acetylenic composition can be applied to the substrate in the form of a dispersion in a binder such as shellac.

Usually the substrate will have deposited thereon a coating of acetylenic compound in the range of 1 to 100 milligrams per square centimeter of surface area and is preferably obtained by spraying a solution of the acetylenic compound containing about 0.1 to 20 parts by weight of acetylenic compound per part by volume of solvent, preferably acetone, and preferably 4 to 6 parts by weight of acetylenic compound per part by volume of solvent, onto the substrate followed by drying of the coated substrate.

A process for measuring the integrated time-temperature or radiation-dosage history of an article is also the subject of this invention and comprises applying the device of this invention to an article, such as an ampoule or carton containing measles vaccine and observing the developing color change in the device. The time-temperature history of exposure will be readily evident to one skilled in the art.

A further subject of this invention is an article, as described herein, with the subject device attached thereto.

EXAMPLE 1

This Example illustrates a process for constructing a recording device for measuring the integrated time-temperature history of exposure at 80° C. for the period between 0 and 225 minutes.

The process used for constructing the device comprises the same general procedure as used for making the device of FIG. 2, except that a square containing sixteen individual recording strips is produced rather than the six strips of FIG. 2. Reference is made where necessary to the analogous steps in the process of constructing the device depicted in FIGS. 1, 2, 3 and 4.

Two grams of BTS, 2,4-hexadiyn-1,6-diol bis(p-toluenesulfonate) were dissolved in 20 ml. of ethylacetate. The entire solution was sprayed on a 8"×6" piece of Whatman filter paper, containing 16 rows of pre-printed integers from 1 to 16. After the pre-printed filter paper was coated with the ethyl acetate solution of BTS, and dried at room temperature to remove solvent, it was cut horizontally into sixteen individual stips analogous to the same step in FIG. 1. Each resulting strip contained 16 identical numbers, e.g. 16, 16, 16 . . . 16, 16 and is referred to as that strip number, e.g. horizontal strip number 16. The strips were pre-reacted by thermally annealing at 80° C. for known different time periods, the periods being multiples of 15-minute intervals, for the total time period from 0 to 225 minutes, as shown below. Thus, strip number 16 was annealed at about 80° C. for 225 minutes, undergoing a color change from colorless to a metallic green gold, the end-point color; and strip number 4 was annealed at about 80° C. for 45 minutes, undergoing a color change from colorless to red.

TABLE I

| Horizontal Strip Number | Annealing time at 80° C. in (minutes) | Color After Annealing |
|---|---|---|
| 16 | 225 | metallic green gold (end-point color) |
| 15 | 210 | black |
| 14 | 195 | dark red |
| 13 | 180 | red |
| 12 | 165 | red |

TABLE I-continued

| Horizontal Strip Number | Annealing time at 80° C. in (minutes) | Color After Annealing |
|---|---|---|
| 04 | 45 | red |
| 03 | 30 | red |
| 02 | 15 | red |
| 01 | 0 | almost white |

After thermally annealing the strips at about 80° C. for the designated predetermined time intervals, the strips were mounted together on an adhesive surface in order to reform the original shape of the design.

The filter paper containing the mounted strips was then cut vertically into sixteen recording strips containing a progressive series of indicating units wherein each unit is pre-reacted to a greater degree than its predecessor. Thus each strip now contains the numbers 01, 02, 03 . . . 15, 16, each number representing an indicating unit pre-reacted for an additional 15-minute period at 80° C. than its predecessor, and constitutes an individual recording device.

EXAMPLE 2

This example illustrates the utility of the recording strip devices prepared in Example 1.

The individual vertical recording strips are identical to each other and each can be utilized to measure an integrated time-temperature history of an article during time periods of from 0 to 225 minutes at 80° C. or correspondingly longer time periods for lower temperatures. To illustrate their utility, the recording strips of Example 1 were individually thermally annealed at about 80° C. in multiples of 15 minute time intervals from 0 to 225 minutes such that each strip was annealed 15 minutes longer than a previous strip in the series.

Figure 4:
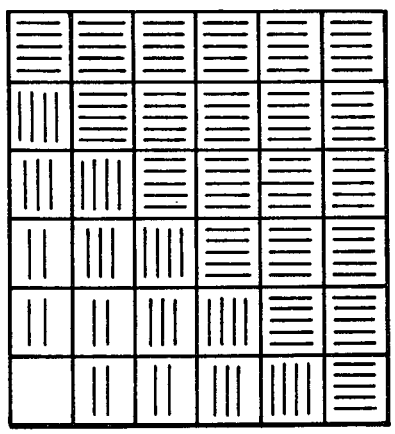
FIG. 4 depicts the six individual exposed recording strips side-by-side illustrating the different resulting integrated time-temperature histories obtained at temperature T for time $t_0$ to $t_5$, where $t_0$ represents time zero and $t_5$ represents the maximum shelf life of an article, at which the end-point color of the indicating unit is formed, as depicted by parallel horizontal lines within the squares. The vertical parallel lines within the squares depict the progressive color changes of the acetylenic compound, wherein the number of lines increases with the depth and intensity of the color. Here, the vertical lines represent gradations of color from light pink to dark red and the horizontal lines represent metallic green-gold, the end-point color. The time, t, required for an indicating unit to form the end-point color at temperature T is known, and thus the number of indicating units displaying the end-point color corresponds to the history of the exposure integrated over the exposure time to which the device has been subjected.

A comparison of the indicator response for increasing storage times at 80° C. is analogous to that shown in FIG. 4.

The following Table summarizes the results of the thermal annealing.

TABLE II

| Vertical Strip Number | Annealing time at 80° C. in (minutes) | Number of Indicating Units Forming End-Point Color |
|---|---|---|
| 16 | 225 | 16 |
| 15 | 210 | 15 |
| 14 | 195 | 14 |
| 13 | 180 | 13 |
| 12 | 165 | 12 |
| 11 | 150 | 11 |
| 10 | 135 | 10 |
| 09 | 120 | 9 |
| 08 | 105 | 8 |
| 07 | 90 | 7 |
| 06 | 75 | 6 |
| 05 | 60 | 5 |
| 04 | 45 | 4 |
| 03 | 30 | 3 |
| 02 | 15 | 2 |
| 01 | 0 | 1 |

As seen in Table II, the integrated time-temperature history upon thermal annealing can be readily correlated with the number of indicating units which have formed the end-point color. Thus, strip 12, containing twelve indicating units displaying the end-point color, had been exposed at 80° C. for 165 minutes (11×15 minutes), and strip 05 containing five indicating units, displaying end-point color, had been exposed for 60 minutes (4×15 minutes). Upon increasing time-temperature exposure, successive units in the indicator array undergo the transition from red to the metallic end-point color, thereby providing the scale of indicator response. The rate of development of indicator response depends strongly upon temperature, as does the degradation characteristics of most perishables. For example, at room temperature the above recording device will go full scale after about one month of storage.

EXAMPLE 3

This Example illustrates the progressive reduction in time required to form the end-point color by prereacting an acetylenic compound with successively larger dosages of gamma radiation.

Samples of HDDBU, 2,4-hexadiyn-1,6-diol bis(n-butylurethane), crystallized from acetone-hexane, in 0.5 gram quantities, were irradiated at room temperature with $Co^{60}$ gamma ray dosages of 0.1, 0.2, 0.3, 0.4, 0.5, 0.6, 0.7, 0.8, 0.9, 1.0 and 1.2 Mrads. The samples were then thermally annealed at 60° C. and color changes were noted as a function of time. The original color and the colors after annealing at 60° C. were determined by matching the indicator color to a Munsell ® Photometer Chart, with Munsell color code for the end-point color of HDDBU.

TABLE IV

| Time | Dose (Mrad) | Color (Munsell ® color code) |
|---|---|---|
| 0 | 0.1 and 0.2 | 10 PB 4/10 |
| " | 0.3 and 0.4 | 10 PB 3/8 |
| " | 0.5 and 0.6 | 10 PB 2.5/6 |
| " | 0.7, 0.8 and 0.9 | 10 PB 2.5/4 |
| " | 1.1 and 1.2 | *10 PB 3/1 |
| 3 hrs | 0.1 and 0.2 | 7.5 PB 4/8 |
| | 0.3 and 0.4 | 7.5 PB 2.5/6 |
| | 0.5 and 0.6 | 10 PB 2.5/4 |
| | 0.7, 0.8, 0.9, 1.1, 1.2 | *10 PB 3/1 |
| 7.5 hrs | 0.1 and 0.2 | 7.5 PB 3/6 |
| | 0.3 and 0.4 | 7.5 PB 2.5/6 |
| 16 hrs | 0.5, 0.6, 0.8, 0.9, 1.1 and 1.2 | *10 PB 3/1 |

As seen from the Table, higher dosages of gamma radiation decrease the time required for HDDBU to form the end-point color (designated by asterisk) upon annealing at 60° C.

EXAMPLE 4

This Example illustrates the preparation and use of a recording device for measuring the required time-temperature period involved in the sterilization of blood albumin.

A solution of 20 weight percent of BTS in acetone was sprayed onto a ½" piece of filter paper and the solvent was evaporated under a flow of nitrogen. A mask containing a ¼" circle was placed over the square and the assembly was exposed to short wave ultraviolet radiation, from a 100 watt high pressure mercury lamp, for a period of about 15–30 seconds at a distance of 3¾" from the source, producing a ¼" exposed red circle in the middle of the filter paper. The square was then thermally annealed at 60° C., and after about 4 hours and 20 minutes, the exposed red circle formed a gold end-point color. Continued annealing at 60° C. for a total of 10 hours resulted in the background forming the same end-point color as the circle and merging together to form a continuous end-point color. Thus, the device can be used to monitor the sterilization of blood albumin which requires heating at 60° C. for a total of 10 hours, wherein the device will indicate when approximately one-half the heating time and when the total heating time has been reached.

It was found that when utilizing BTS as the indicator and Whatman No. 1 Filter Paper as the substrate, consistent color changes from zero time to end-point color for each indicating tab could be achieved. This was accomplished by using a 5 wt./volume percent of BTS in acetone, spraying the solution onto the filter paper, supported in an upright position against a backdrop, wherein the distance from the spraying means, i.e. an atomizer spray, to the filter paper, was kept fairly constant at a value of about 8", which was maintained while the spraying was conducted in a side-to-side and then up and down manner. The sprayed filter paper was then quickly removed from the backdrop and refrigerated. Upon exposure to thermal annealing, the color of the end-point of each tab was essentially identical to the eye.

We claim:

1. A device comprising a substrate having deposited thereon at least two indicating units, each unit comprised of an acetylenic compound, or simple mixture thereof, each acetylenic compound containing at least one —C≡C—C≡C group, capable of reacting by 1,4-addition polymerization, thereby forming an end-point color after an irreversible, progressive color change upon thermal annealing or exposure to radiation selected from visible, ultraviolet, gamma ray, x-ray, alpha ray, beta ray, electron beam and laser beam radiation, said end-point color representing an integrated time-temperature history of thermal annealing or radiation-dosage history of exposure to said radiation, wherein one indicating unit is unreacted and representing zero time of exposure and the other said indicating unit being pre-reacted at 20°–300° C. by thermal annealing or exposure to said radiation to known extent and color, whereby the time required by such pre-reacted unit to form the end-point color by thermal annealing at a given temperature or for a known thermal history or exposure to said radiation at a given average radiation dosage rate is pre-determined and known.

2. The device of claim 1 wherein the acetylenic compound is pre-reacted by thermal annealing.

3. The device of claim 1 wherein the acetylenic compound is pre-reacted by exposing to a laser beam, electron beam, gamma radiation or ultraviolet radiation.

4. The device of claim 1 wherein at least one pre-reacted unit is pre-reacted to an extent of exhibiting end-point color.

5. The device of claim 1 wherein the pre-reacted unit forms the end-point color in about 15 to 30 days at a temperature of about 0° to 10° C.

6. The device of claim 1 wherein the pre-reacted unit forms the end-point color in about 8 to 12 hours at 50° to 70° C.

7. The device of claim 1 wherein the pre-reacted acetylenic compound is 2,4-hexadiyn-1,6-diol bis(p-toluenesulfonate) and forms the end-point color in about 1 month to 2 years at 0° to 8° C.

8. The device of claim 1 wherein the acetylenic compound is selected from the group consisting of diynes, triynes, tetraynes and hexaynes.

9. The device of claim 1 wherein the acetylenic compound contains at least one substituent selected from the group consisting of alkyl, aryl, sulfonate, urethane, acid, ester and alcohol radicals.

10. The device of claim 1 wherein the acetylenic compound is a diyne selected from the group consisting of 2,4-hexadiyn-1,6-diol, 3,5-octadiyn-1,8-diol, 4,6-decadiyn-1,10-diol, 5,7-dodecadiyn-1,12-diol and sulfonate and urethane derivatives thereof.

11. The device of claim 10 wherein the acetylenic compound is 2,4-hexadiyn-1,6-diol bis(n-butyl)-urethane.

12. The device of claim 10 wherein the acetylenic compound is 2,4-hexadiyn-1,6-diol bis(p-toluenesulfonate).

13. The device of claim 1 further comprising a series of indicating units, each unit of the series, containing an acetylenic compound or simple mixture thereof, being pre-reacted to a greater known extent than its predecessor, thereby decreasing by known intervals the time required for each unit to form the end-point color compared to the preceding unit, whereby the number of indicating units which have formed the end-point color upon exposing the device to thermal annealing or to radiation of claim 1 corresponds to the history of the exposure integrated over the exposure time to which the device has been subjected.

14. The device of claim 13 further comprising an indicating unit which exhibits end-point color.

15. A process for measuring the integrated time-temperature or radiation-dosage history of an article comprising the steps of (a) applying to an article the device of claim 1 and (b) observing the developing color changes in the device.

* * * * *